United States Patent

Svejkovsky

Patent Number: 5,842,678
Date of Patent: Dec. 1, 1998

[54] MACHINERY MOUNT

[76] Inventor: Paul A. Svejkovsky, Rte. 2, Box 338-A, Marquez, Tex. 77865

[21] Appl. No.: 856,510
[22] Filed: Apr. 15, 1997
[51] Int. Cl.⁶ .................................................... F16M 1/00
[52] U.S. Cl. ........................................... 248/650; 248/680
[58] Field of Search ............................... 248/188.4, 649, 248/650, 677, 680, 688, 542, 916

[56] References Cited

U.S. PATENT DOCUMENTS

| | | |
|---|---|---|
| 331,460 | 12/1885 | Suckow . |
| 673,262 | 4/1901 | Hine . |
| 842,641 | 1/1907 | Fernau . |
| 867,531 | 10/1907 | Potter . |
| 994,461 | 12/1911 | Olander . |
| 1,086,619 | 2/1914 | Rinebold . |
| 1,102,792 | 7/1914 | Patton . |
| 1,647,992 | 11/1927 | Hartman . |
| 1,757,963 | 5/1930 | Herold . |
| 1,925,573 | 9/1933 | Schurman . |
| 2,010,299 | 8/1935 | Gray . |
| 2,215,117 | 9/1940 | Cressman . |
| 2,687,268 | 8/1954 | Hawes . |
| 2,940,297 | 6/1960 | Mayer . |
| 2,970,236 | 1/1961 | De Paul et al. . |
| 3,166,782 | 1/1965 | Miller . |
| 3,356,324 | 12/1967 | Attermeyer . |
| 3,601,345 | 8/1971 | Johnson . |
| 4,061,298 | 12/1977 | Kober . |
| 4,289,924 | 9/1981 | Pearce, Jr. et al. ........................ 248/56 |
| 4,407,042 | 10/1983 | Schramme et al. ........................ 248/56 |
| 4,974,801 | 12/1990 | Pulsifer ................................ 248/188.4 |
| 5,000,416 | 3/1991 | Fantasia . |
| 5,104,075 | 4/1992 | Freeman . |
| 5,131,621 | 7/1992 | Sdano . |
| 5,351,807 | 10/1994 | Svejkovsky . |

FOREIGN PATENT DOCUMENTS

| | | |
|---|---|---|
| 505800 | 11/1919 | France . |
| 172991 | 11/1934 | Germany . |

OTHER PUBLICATIONS

Advertisement: "Level-It" Leveling Pads, 1 pg.

*Primary Examiner*—Ramon O. Ramirez
*Assistant Examiner*—Robert Lipcsik
*Attorney, Agent, or Firm*—Browning Bushman

[57] ABSTRACT

A machinery mount 10 for positioning a machine on a mounting surface 13 comprises a base plate 12 and an upwardly projecting dimple 22 defining curvilinear outer surface 38, an interior cavity 56, and a hole 24 through an upper portion thereof A stud 11 includes an upper threaded portion 16 projecting upwardly from the base plate 12 for passing through the aperture in the machine base 19, and the lower shaft portion 26 passing through the hole 24 in the dimple portion. A washer 30 is secured to a lower end of the lower shaft portion 26 for preventing the lower shaft portion from passing upward through the hole 24 in the dimple 22. A stud support 42 is secured to the stud and includes a central passageway 21 for receiving the lower shaft portion 26 of the stud, and a lower curved surface 36 for sliding engagement with the curvilinear outer surface 38 of the dimple 22, such that the stud 11 may pivot with respect to the base plate 12. An injection port 44 is provided to permit the injection of a sealant from an outside source through the injection port and the central passageway 21 and into interior cavity 56 for preventing bacterial growth. The mount provides rigid mounting or cushioning mounting by the selective elimination or the use of an appropriate rubber pad.

27 Claims, 3 Drawing Sheets

MACHINERY MOUNT

FIELD OF THE INVENTION

The present invention relates to a machinery mount for positioning a machine on a mounting surface. The machinery mount is economical to manufacture and will withstand the loads placed thereon by heavy machinery, even when the longitudinal axis of the mount is angularly displaced relative to a line perpendicular to the mounting surface. Additionally, the present invention relates to a machinery mount with an injection port in a stud support for injecting a sealant into internal cavities within the mount and between the mount and mounting surfaces.

BACKGROUND OF THE INVENTION

Conventional machinery mounts have an upwardly projecting threaded stud or shaft affixed to a spherical ball which rotates and pivots with respect to a mounting plate. The stud is secured to the mounting plate by swaging or otherwise deforming the upper side walls of the plate after the ball is inserted into the socket. The mounting plate is secured to the floor or to another piece of equipment by conventional mounting screws or bolts which pass through respective apertures in the mounting plate. The machine may desirably be leveled even though the mounting surface on the floor is not level.

The ball is received within a generally spherical socket in the mounting plate, and accordingly the stud may both rotate and pivot with respect to the mounting plate. Since the stud may rotate with respect to the base plate once the base plate has been affixed to the floor, the stud may thereafter be threaded into a corresponding threaded hole in the foot of the machine.

Conventional mounts of this type are expensive to manufacture because of the amount of material required to provide a socket sufficiently large to receive the ball. This is especially true when the environment requires a corrosion resistant material, such as stainless steel. Additionally, the lower foot of the machine must be positioned significantly above the surface of the floor on which the base plate is positioned, creating a higher center of gravity and less stability for the machine. The weight of the machine is supported by a plurality of studs which, in turn, transmit the machine weight to the respective balls which press against the lowermost surface of the respective spherical cavities in the base plates. Moreover, conventional ball and socket machinery mounts are disadvantageous for mounting machines when used in an environment that is required to be substantially clean or sterile because water, dirt and bacteria may accumulate in the socket provided in the base plate and between the base plate and the mounting surface. One commonly used machinery mount of this type is marketed as a LEVEL-IT™ leveling pod.

A great deal of prior art exists relative to machinery mounts, including U.S. Pat. Nos. 331,460; 672,262; 842,641; 867,531; 994,461; 1,086,619; 1,102,792; 1,647,992; 1,757,963; 1,925,573; 2,010,299; 2,215,117; 2,687,268; 2,940,297; 2,970,236; 3,166,782; 3,356,324; 3,601,345; 4,061,298; 5,000,416; 5,104,075, and 5,131,621. The prior art discloses various techniques which allow an upwardly projecting shaft to pivot relative to a base surface utilizing either ball and socket or a dimple design. Although some of these prior art designs are less costly to manufacture, they all have significant disadvantages, and none apparently are commercially acceptable. Many designs are not intended to support a large weight of the type normally imparted on machinery mounts. None of these prior art designs address the problems associated with using a machinery mount in a clean or sterile environment.

The disadvantages of the prior art are overcome by the present invention, and an economical machinery mount that includes a stud that is both rotatable and capable of pivoting in any direction relative to a mounting surface is hereinafter disclosed.

SUMMARY OF THE INVENTION

The machinery mount of the present invention may be used to support and level a wide variety of equipment. The machinery mount includes a hemispherical dimple that protrudes upwardly from a lower surface of the mount base plate. The dimple pivotally engages a threaded stud or shaft protruding upwardly therefrom. An economical construction and high structural integrity between the mounting surface and the machine are provided by using an upwardly projecting dimple and a threaded stud which permit virtually all of the weight of the machine be transmitted through the dimple as a compression load rather than a bending load. The high structural integrity of the mount also provides resistance to horizontal loading up to approximately one and one-half times the weight of the machine. Since machinery mounts are frequently used in industries that are required to meet strict environmental standards, the present invention provides a machinery mount with an injection port for transmitting a sealant into the internal cavities and crevices both between the machinery mount parts and between the machinery mount and the floor surface to which the mount is secured.

It is an object of the present invention to provide a machinery mount that is both economical to manufacture and provides high structural integrity between an upwardly projecting dimple on the base plate and a threaded stud pivotally engaged therewith.

It is another object of this invention to provide a machinery mount employing a threaded stud including a lower surface nominal diameter and a dimple including a nominal inner surface diameter within a plane of a lower surface of a base plate, such that the lower surface nominal diameter of the stud is at least 90 percent of the nominal inner surface diameter of the dimple.

Yet another object of the present invention is to provide a machinery mount with an injection port on the external surface of a stud support for transmitting a sealant into the internal cavities of the mount to minimize or eliminate locations where water or dirt accumulate.

It is a feature of this invention to provide a machinery mount with a threaded shaft that rotates 360 degrees for adjusting the height of the machine relative to the mount, and that may pivot within 10 degrees relative to the base plate for misalignment between the base plate and the hole in the machine foot for receiving the threaded shaft.

It is also a feature of the present invention to provide a machinery mount with a threaded shaft that can be easily interchanged to accommodate both various size apertures in the machine leg or foot and various machine weights.

Yet another feature of this invention is a machinery mount with high structural integrity that minimizes bending forces on mount components by substantially transmitting the weight of the machine as compression forces through the mount components.

It is an advantage of the present invention that the machinery mount includes a locking member or washer secured to a lower end of the threaded shaft for preventing the shaft from passing upward through a hole in the dimple portion, such that the locking member is capable of withstanding vertical loads on the threaded shaft, and the threaded shaft and mounting plate are interconnected as an assembly prior to use. This enables the mount to withstand significant vertical loads (up to 50 percent of the downward load rating) that may be encountered during shipping of the equipment or during an earthquake.

It is another advantage of the invention that the machinery mount is designed to facilitate cleaning.

Yet another feature of the invention is a machinery mount which uses few components, and wherein universal components may be used with different studs to minimize manufacturing costs.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
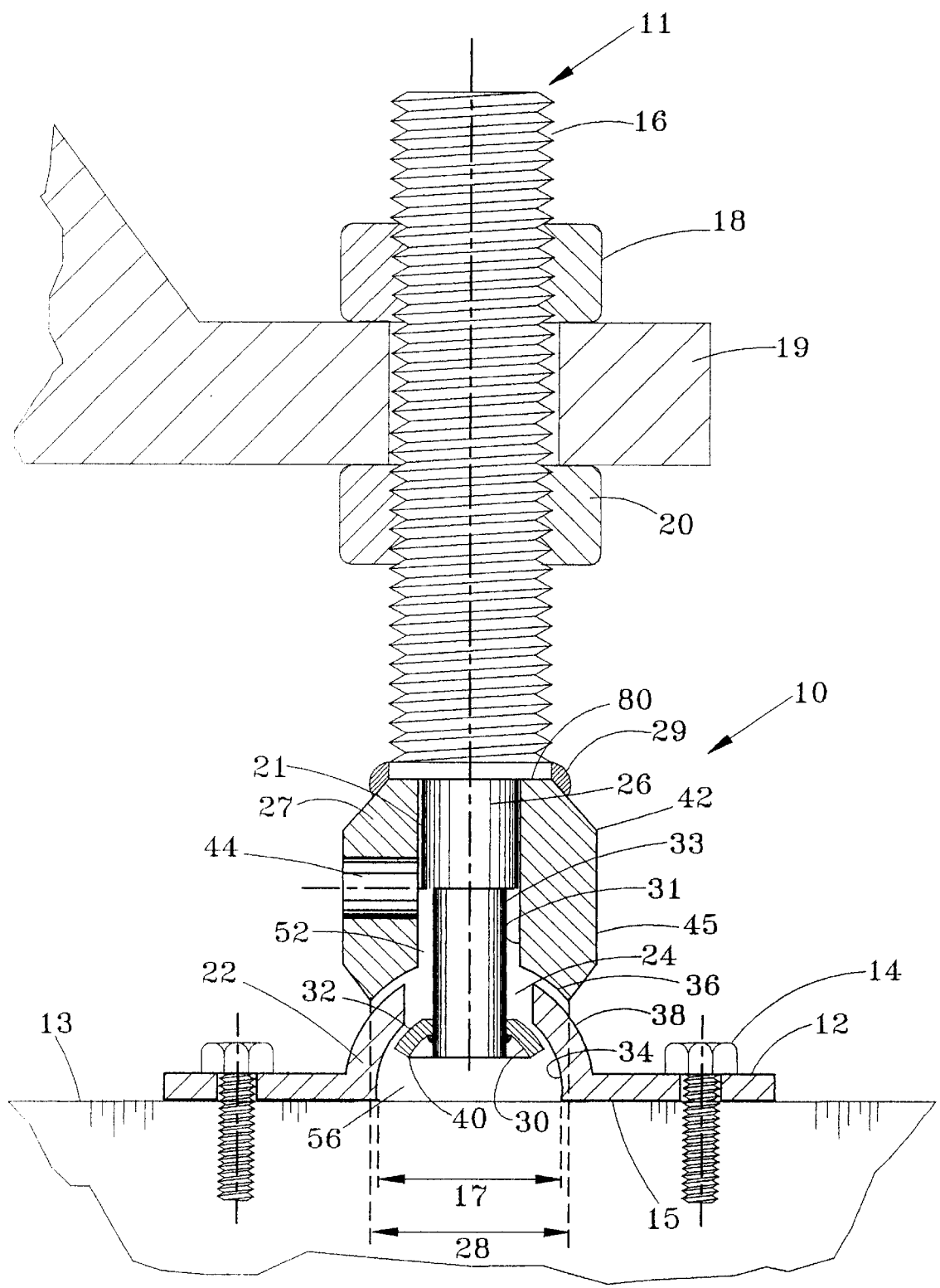
FIG. 1 a cross-sectional view of one embodiment of the present invention depicting the machinery mount secured to a machine leg by an upper and lower adjusting nut.

With reference to FIG. 1, a machinery mount 10 is generally shown having a base plate 12 which may have circular configuration and includes a plurality of peripheral holes therein for receiving bolts 14 to securely affix the base plate 12 into a mounting surface 13, which may be either the floor or a mounting surface provided on another machine. The base plate 12 may be deformed from a metal plate which is relatively thin compared to conventional machinery mount base plates and includes a planar lower surface 15 for engagement with the mounting surface 13.

The base plate 12 also includes an outwardly projecting dimple portion 22 that is homogenous with the planar lower surface 15 of the base plate 12 and includes a hole 24 passing through an upper portion thereof The dimple portion 22 defines a curvilinear outer surface 38, a generally curvilinear inner surface 34 having a maximum nominal inner surface diameter 17 within the plane of the lower surface 15, and an interior cavity 56 spaced between the inner surface 34 and the planar lower surface 15. The dimple portion 22 is preferably deformed from, and is thus homogeneous with, the base plate 12 to reduce manufacturing costs. A somewhat smaller diameter hole than finally intended in the dimple portion 22 may be initially formed in a flat plate. When the dimple portion 22 is subsequently formed, the diameter of the hole 24 will expand to its intended diameter to receive the stud. Less desirably, the dimple portion 22 may be separately formed and then fixedly secured to the base plate 12. The curvilinear outer surface 38 of the dimple portion 22 preferably has a semi-spherical configuration.

A stud 11 is provided having an upper threaded portion 16 projecting upwardly from the base plate 12 for passing through the aperture in the machine base, and a lower shaft portion 26 for passing through the hole 24 in the dimple portion 22. The lower shaft portion 26 of the stud 11 preferably has a nominal diameter equal to or less than about 50 percent a nominal diameter of the upper threaded portion 16 of the stud 11.

A locking member or washer 30 is secured to a lower end of the lower shaft portion 26 by welding or other conventional means, and has a curved upper surface 32 for engagement with the curvilinear inner surface 34 of the dimple portion 22. The locking member 30 prevents the lower shaft portion from passing upward through the hole 24 in the dimple portion 22. The locking member 30 thus secures the machine to the mounting surface if an upward force is applied to the machine. Such an upward force may occur, for example, during shipment of the machine or during an earthquake. The locking member 30 also retains the stud and the base plate together as an assembly prior to use of the machinery mount. The member 30 may be press formed by a stamping operation.

A stud support 42 is cast or otherwise formed to include a central axial passageway 21 for receiving lower shaft portion 26 of the stud 11 and an upper portion 27 defining a generally flat upper support surface 80. The upper portion 27 of the stud support 42 is affixed to the juncture between the upper threaded portion 16 and lower shaft portion 26 by welding or other suitable means to allow stud support 42 to turn threaded portion 16. The weld also forms at least a substantial seal 29 between the stud support 42 and the stud 11. The stud 11 and stud support 42 may alternatively be integrally formed from a unitary material. A lower curved surface 36 is provided on the stud support for sliding engagement with the curvilinear outer surface 38 of the dimple portion 22, such that the stud 11 may pivot with respect to the base plate 12. This lower curved surface may be cast when the support is initially formed, or may be machined with little material removed in the machinery operation.

The lower curved surface 36 preferably defines at least a portion of a sphere for mating engagement with the curvilinear outer surface of the dimple portion 38. In a preferred embodiment, the lower curved surface 36 has a lower surface nominal diameter 28 substantially the same as the nominal inner surface diameter 17. The lower surface nominal diameter 28 may be from 75 to 110 percent of the nominal inner surface diameter 17, but preferably is from about 90 to 105 percent of the nominal inner surface diameter 17, and most preferably is about 100 percent of the nominal inner surface.

An injection port 44 is spaced axially between the upper portion 27 and the lower curved surface 36 and extends radially inward from an exterior surface of the stud support 42. The injection port 44 provides fluid communication with the central axial passageway 21 for injecting a sealant into an interior cavity 56 of the dimple portion 22, as more fully described and shown in FIG. 3.

In a preferred embodiment, the central axial passageway 21 extending between the injection port 44 and the lower curved surface 36 includes a nominal diameter 31 at least 10 percent greater than the maximum nominal diameter of the lower shaft portion of the stud 33, such that any injected sealant may flow freely through an injection annulus 52 into the interior cavity 56. A plurality of circumferentially spaced planar exterior surfaces or wrench flats 45 may be formed on the stud support 21 for effecting 360 degree rotation of the stud 11 with respect to the base plate 12. The planar exterior surfaces 45 may be used to thread the stud 11 directly to a threaded hole 43 provided in the machine base 19, as shown in FIG. 2.

FIG. 1 depicts a locking nut 18 for threaded engagement with the upper threaded portion of the stud 16 for fixing the position of the stud 11 with respect to the machine base 19. A supporting nut 20 is also provided for threaded engagement with the upper threaded portion of the stud 16 for supporting the machine base 19 on the stud 11. Alternatively, the machine base aperture 43 for receipt of the stud 11 may be threaded, as shown in FIG. 2, for mating engagement with the stud. A single locking nut 18 may then be provided for threaded engagement with the upper threaded portion of the stud 16 for fixing the position of the stud 11 with respect to the machine base 19. Each of the nuts 18, 20 may be a conventional commercially available nut intended for threaded engagement with the stud.

Figure 2:
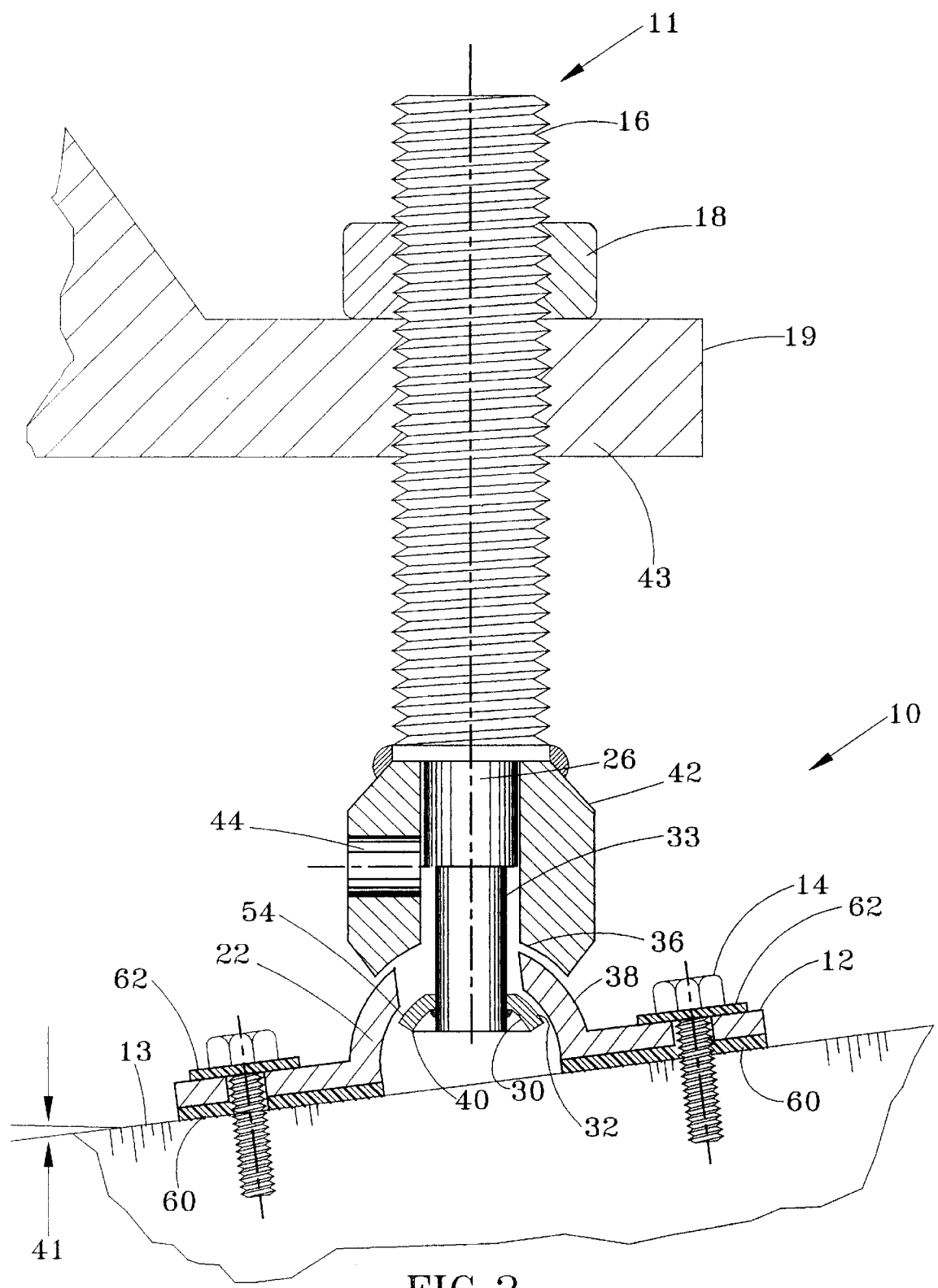
FIG. 2 is cross-sectional view of another embodiment of the present invention depicting the machinery mount threadably engaged with a threaded port in a machine leg. The machine is secured to the mount by an upper lock nut, and the floor surface on which the mount is positioned is inclined relative to the machine leg.

With reference now to FIG. 2, the machinery mount 10 is capable of raising the machine base 19 substantially away from the floor or surface 13 by adjustably rotating the stud 11. The machinery mount 10 is designed, however, so that the machine base 19 may be positioned closely adjacent the floor 13, thereby lowering the center of gravity of the machine compared to prior art machinery mounts. The lower surface 40 of the washer 30 is positioned above the floor 13 to which the base 12 is secured in order that the stud 11 may pivot with respect to the base plate 12 about 10 degrees in any direction, as demonstrated by the angle 41 formed between the floor surface 13 and a plane parallel to the machine leg 19. This feature not only allows the machine to be leveled on a non-leveled mounting surface, but also allows the machine, if desired, to be tilted. The machinery mount of this invention thus allows the legs of a conveyor to be adjusted vertically so that the front of the conveyor may be slightly higher than the rear of the conveyor.

The weight of the machine is transferred from the respective upper threaded portion 16 of a plurality of studs 11 to the lower curved surface of the stud support 36 and curvilinear outer surface of the corresponding dimple portion 38. Thus, the dimple portion 22 supports the weight of the machine, and this weight force is directed through the base 12 and then to the floor 13.

Referring to FIG. 1, high structural integrity and minimum component deflection of the machinery mount components is achieved since the lower surface nominal diameter 28 on the stud support is substantially identical to the nominal inner surface diameter 17 of the dimple portion 22. The load carried by the machinery mount 10 is directly transmitted through the dimple 22 substantially as a compressive force, and then through base 12 and to the floor 13. Minimum bending or deflection forces are applied to the dimple portion 22 when the mount supports the machine.

When horizontal loads are imposed substantially traverse to the axis of the stud 11 on the machinery mount, each pound of downward force (weight of the machine) causes resistance to such horizontal load in an amount of about 1.6 lbs. for the embodiment shown in FIG. 1, wherein the lower surface nominal diameter 28 is substantially equal to the nominal surface inner diameter 17, e.g. a 1:1 ratio. When the lower surface nominal diameter 28 is 75 percent of the nominal inner surface diameter 17, the resistance to such a horizontal load is only 0.82 lbs., i.e., about one-half of when substantially a 1:1 ratio is achieved between the lower surface nominal diameter 28 and the nominal inner surface diameter 17. When this 1:1 ratio is used, deflection of the walls of the dimple portion is reduced to less than ¹⁄₄₀th deflection which occurs when the lower surface nominal diameter 28 is 75% of the nominal inner surface diameter 17. According to a preferred embodiment of the invention, the lower curved surface 36 of the stud has a lower surface nominal diameter 28 which is at least 90% of the nominal inner surface diameter 17 of the dimple portion 22.

Referring to FIG. 2, when the machinery mount 10 is assembled, a small clearance 54 may be provided between the top of the washer 32 and the dimple portion 22 in the base 12. This clearance prevents binding of the machinery mount components when the stud 11 is rotated. If an upward load is imposed on the stud 11, this clearance 54 is eliminated, allowing the washer 30 to bear a vertical load. The machinery mount may sustain a considerable vertical load on the stud 11 limited by the strength of the stud 11 at its smallest diameter 33. Typically, this upward load limit would be about 50 percent of the downward load rating.

It is a particular feature of this invention that only the stud 11 need be replaced to provide a variety of machinery mounts each adapted for a particular use. A stud with a selected thread diameter and thread spacing may thus be used to accommodate different size apertures or threads in the machine base 19. The nominal diameter of the threaded portion of the stud typically will be in the ½" to 1" range, and either English or metric threads may be provided on the stud. The stud support 42, the mounting base 12 and the locking washer 30 may thus be provided in only one or a limited number of sizes in order to accommodate a large number of studs. The cost of manufacturing the machinery mount is thereby substantially reduced. The machinery mount need include only a few components, thereby further reducing the manufacturing costs.

Figure 3:
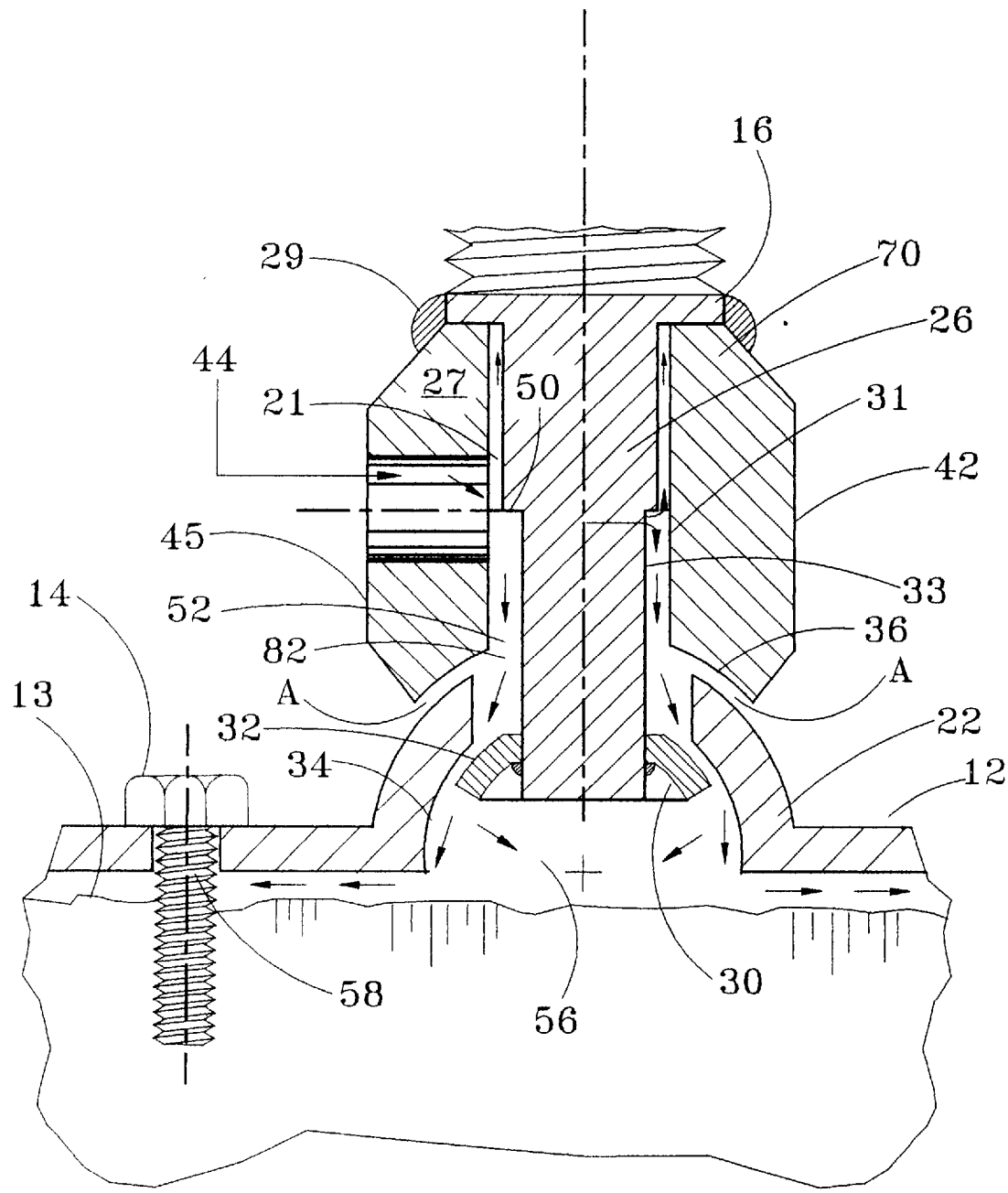
FIG. 3 is exploded cross-sectional view of a portion of the machinery mount, illustrating the flow path of a sealant through an injection port and into internal cavities within the machinery mount.

With reference now to FIG. 3, an exploded cross-sectional view of the stud support 42 and adjacent structure are shown for a more detailed description of the injection port 44. The exterior surface 45 adjacent the injection port 44 may be smooth or threaded to adapt to an external source of sealant. The lower shaft portion 26 preferably includes a nominal diameter of less than 50 percent a nominal diameter of the upper threaded portion of the stud 16. Additionally, the central axial passageway 21 extending between an upper shoulder 50 above at least a portion of the injection port and lower shoulder formed by washer 32 positioned within the cavity 52 includes a lower passageway portion 82 having a nominal diameter 31 at least 10 percent greater than a nominal diameter of the lower shaft portion of the stud 33 in order that the sealant may flow freely through an injection annulus 52 into the interior cavity 56 as shown by the arrows in FIG. 3. The sealant may be injected using a conventional caulking gun. The injected sealant may also flow upwards through the central axial passageway 21 until reaching the seal 29 between the upper portion of the stud support 27 and the upper threaded portion 16 of the stud 11. The injected sealant will also flow axially downward through the annulus 52 and between the lower curved surface 34 of the dimple 22 and the curved upper surface 32 of the washer 30 to enter the interior cavity 56. The injected sealant may continue to flow from the interior cavity 56 and under the base plate 12 and through axial passage 58 until visibly surrounding the bolts 14, at which time the injection process may be terminated. Escape of the sealant between the lower curved surface 36 of the stud support 42 is prevented by mating metal-to-metal engagement of these surfaces and to the weight of the machine on the machinery mount.

The injected sealant does not interfere with the operation or purpose of the installed machinery mount, since the sealant is pliable, and since there is little movement of the metal machinery mount components relative to each other once the mount is installed and the sealant is then injected. Most of the surfaces on the machinery mount, such as surface 70 shown in FIG. 3, are preferably angled to discourage dust accumulation and facilitate washdown and cleaning. Other remaining horizontal surfaces, such as the top of plate 12, may be easily cleaned. Preferably, no cavities are provided for holding water or dirt. As discussed above, all or substantially all internal cavities in the machinery mount are filled with suitable sealant, such as RTV. All components of the machinery mount may be fabricated from non-corrosive materials, such as stainless steel.

The machinery mount described above provides for a rigid mounting of the machine on the mounting surface. There are applications where various degrees of vibration isolation, cushioning or anti-skid properties are desired between the machine and the mounting surface. A suitable rubber cushioning pad 60 is shown in FIG. 2. The mount as described above readily adapts to these requirements by the selective addition of an appropriate rubber pad between the base plate 12 and mounting surface 13. This rubber pad may be attached to the base plate 12 by gluing. If the mounts are to be bolted to the mounting surface, rubber grommets (not shown) or washers 62 as shown in FIG. 2 may be used around the bolts to maintain the desired rubber isolation. The rigidity of the basic mount may thereby be easily altered by selecting the appropriate rubber or other isolation material to facilitate the intended property.

Various other modifications to the machinery mount as disclosed herein should be apparent from the above description of preferred embodiments. Although the invention has thus been described in detail for these embodiments, it should be understood that this explanation is for illustration, and that the invention is not limited to these embodiments. Alternate components and installation techniques will be apparent to those skilled in the art in view of this disclosure. Additional modifications are thus contemplated and may be made without departing from the spirit of the invention, which is defined by the claims.

What is claimed is:

1. A mount for positioning a machine on a mounting surface, the machine including a machine base having an aperture therein for receiving the mount, the mount comprising:

a metal base plate having a planar lower surface for engagement with the mounting surface;

an upwardly projecting dimple portion secured to the base plate, the dimple portion formed from metal and defining a hemispherical outer surface and an inner surface having a nominal inner surface diameter defining an interior cavity spaced between the dimple portion and the planar lower surface, the dimple portion including a hole through an upper portion thereof;

a stud including an upper threaded portion projecting upwardly from the base plate for passing through the aperture in the machine base, a lower shaft portion of the stud passing through the hole in the dimple portion, and a stud support, fixedly secured to the stud, with a lower curved surface of the stud support configured for sliding engagement with the hemispherical outer surface of the dimple portion, such that the stud may pivot with respect to the base plate and vertical spacing between the metal base plate and a portion of the stud passing through the hole in the dimple portion remaining fixed for vertically fixing the machine relative to the mounting surface, the lower curved surface of the stud support having a lower surface nominal diameter of at least 90 percent of the nominal inner surface-diameter; and a locking member secured to a lower end of the lower shaft portion for preventing the lower shaft portion from passing upward through the hole in the dimple portion.

2. The mount as defined in claim 1, further comprising:

the stud including a plurality of circumferentially spaced planar exterior surfaces thereon for effecting rotation of the stud with respect to the base plate.

3. The mount as defined in claim 1, further comprising:

the base plate including at least one mounting aperture extending through the base plate; and at least one securing member for passing through the respective mounting aperture in the base plate for securing the base plate to the mounting surface.

4. The mount as defined in claim 1, further comprising:

a locking nut for threaded engagement with the upper threaded portion of the stud for fixing the position of the stud with respect to the machine base.

5. The mount as defined in claim 4, further comprising:

a supporting nut for threaded engagement with the upper threaded portion of the stud for supporting the machine base on the stud.

6. The mount as defined in claim 1, wherein the locking member comprises a washer having a curved upper surface for engagement with a curvilinear inner surface of the dimple portion of the base plate.

7. The mount as defined in claim 6, wherein the washer is weldably affixed to a lower end of the lower shaft portion.

8. The mount as defined in claim 1, wherein:

the stud includes a stud support weldably affixed to the upper threaded portion, the stud support including thereon the lower curved surface; and the stud may pivot with respect to the base plate.

9. The mount as defined in claim 1, wherein the lower shaft portion of the stud has a nominal diameter no greater than about 50 percent a nominal diameter of the upper threaded portion of the stud.

10. A mount for positioning a machine on a mounting surface, the machine including a machine base having an aperture therein for receiving the mount, the mount comprising:

a metal base plate having a planar lower surface for engagement with the mounting surface;

an outwardly projecting dimple portion secured to the base plate, the dimpleportion formed from metal and defining a hemispherical outer surface and an inner surface having a nominal inner surface diameter defining an interior cavity spaced between the dimple portion and the planar lower surface, the dimple portion including a hole through an upper portion thereof;

a stud having a stud axis and an upper threaded portion projecting upwardly from the base plate for passing through the aperture in the machine base, and a lower shaft portion passing through the hole in the dimple portion; and a stud support fixedly secured to the stud, the stud support including a central axial passageway therethrough for receiving the lower shaft portion of the stud, an upper portion for at least substantial sealing engagement with the stud, a lower curved surface configured for sliding engagement with the hemispherical outer surface of the dimple portion such that the stud may pivot with respect to the base plate, the lower curved surface of the stud support having a lower surface nominal diameter of at least 90 percent of the nominal inner surface diameter, and an injection port spaced axially between the upper portion and the lower curved surface and extending radially inward from an exterior surface of the stud support into fluid communication with the central axial passageway for injecting a sealant through the central axial passageway and into the interior cavity in the dimple portion.

11. The mount as defined in claim 10, further comprising: the upper portion of the stud support including a support surface for supporting the stud on the stud support.

12. The mount as defined in claim 10, wherein the stud support is fixed to the stud by a weld, the weld forming at least a substantial seal between the stud support and the stud.

13. The mount as defined in claim 10, further comprising: the central axial passageway including a lower passageway portion extending axially between the injection port and the lower curved surface and having a nominal diameter at least 10 percent greater than a nominal diameter of the lower shaft portion of the stud positioned within the lower passageway portion, such that injected sealant may flow between the injection port and the interior cavity in the dimple portion through an injection annulus.

14. The mount as defined in claim 10, further comprising: the stud support including a plurality of circumferentially spaced planar exterior surfaces thereon for controlling rotation of the stud support and the stud with respect to the base plate.

15. The mount as defined in claim 10, further comprising: a locking member secured to a lower end of the lower shaft portion for preventing the lower shaft portion from passing upward through the hole in the dimple portion; and
the locking member having a curved upper surface for engagement with a curvilinear inner surface of the dimple portion.

16. A mount for positioning a machine on a mounting surface, the machine including a machine base having an aperture therein for receiving the mount, the mount comprising:
a metal plate having a planar lower surface for engagement with the mounting surface;
an upwardly projecting dimple portion secured to the base plate, the dimple portion formed from metal and defining a hemispherical outer surface, a generally hemispherical inner surface having a nominal inner surface diameter within a plane of the planar lower surface, and an interior cavity spaced between the inner surface and the planar lower surface, the dimple portion including a hole through an upper portion thereof;
a stud including an upper threaded portion projected upwardly from the base plate for passing through the aperture in the machine base, a lower shaft portion passing through the hole in the dimple portion, and a lower curved surface for sliding engagement with the hemispherical outer surface of the dimple portion such that the stud may pivot with respect to the base plate and vertical spacing between the metal base plate and a portion of the stud passing through the hole is the dimple portion remaining fixed for vertically fixing the machine relative to the mounting surface;
the lower curved surface having a lower surface nominal diameter of at least 90 percent of the nominal inner surface diameter; and
a locking member secured to a lower end of the lower shaft portion for preventing the lower shaft portion from passing upward through the hole in the dimple portion.

17. The mount as defined in claim 16, further comprising:
the stud including a plurality of circumferentially spaced planar exterior surfaces thereon for effecting rotation of the stud with respect to the base plate.

18. The mount as defined in claim 17, further comprising:
the base plate including at least one mounting aperture extending through the base plate; and
at least one securing member for passing through the respective mounting aperture in the base plate for securing the base plate to the mounting surface.

19. The mount as defined in claim 16, further comprising:
a locking nut for threaded engagement with the upper threaded portion of the stud for fixing the position of the stud with respect to the machine base; and
a supporting nut for threaded engagement with the upper threaded portion of the stud for supporting the machine base on the stud.

20. The mount as defined in claim 16, wherein the locking member comprises a washer having a curved upper surface for engagement with a curvilinear inner surface of the dimple portion.

21. A method of manufacturing a mount for positioning a machine on a mounting surface, comprising;
deforming a metal plate to form a base plate having a planar lower surface for engagement with the mounting surface and an upwardly projecting dimple portion being integral with and of the same material as the planar lower surface, the dimple portion defining a generally hemispherical outer surface, a generally hemispherical inner surface having a nominal diameter, and an interior cavity spaced between the dimple portion and the lower surface;
forming a hole through an upper portion of the dimple portion;
providing a stud having an upper threaded portion and a lower shaft portion having a diameter significantly less than a diameter of the upper threaded portion;
forming a stud support including a central passageway therein and a lower curved surface circumferentially about the central passageway the curved lower surface having a nominal diameter of at least 90% of the nominal inner surface diameter;
fixedly securing the stud to the stud support such that the lower shaft portion of the stud passes through the central passageway in the stud support;
passing the lower shaft portion of the stud through the hole in the upper portion of the dimple portion, such that the upper threaded portion projects upwardly from the base plate and the curved lower surface of the stud support is in sliding engagement with the curvilinear outer surface of the dimple portion; and
securing a locking member to a lower end of the lower shaft portion for preventing the lower shaft portion from passing upward through the hole in the dimple portion.

22. The method of manufacturing a mount as defined in claim 21, further comprising:
forming a plurality of circumferentially spaced planar exterior surfaces on the stud support for effecting rotation of the stud support and the stud with respect to the base plate.

23. The method of manufacturing a mount as defined in claim 21, wherein forming the stud support further comprises:

casting the stud support with the lower curved surface thereon.

24. The method of manufacturing the mount as defined in claim 21, wherein the locking member is formed to include a curved upper surface for engagement with a curvilinear inner surface of the dimple portion of the base plate.

25. The method of manufacturing a mount as defined in claim 21, further comprising:

forming an injection port through an outside surface of said stud support and extending radially inward for fluid communication with the central passageway in the stud support; and injecting a sealant through the injection port and the central passageway in the stud support, and into the interior cavity in the dimple portion.

26. The method of manufacturing a mount as defined in claim 21, further comprising:

positioning a cushioning member between the planar lower surface and the mounting surface for cushioningly supporting of the machine to the mounting surface.

27. The mount as defined in claim 1, further comprising:

the stud support including a plurality of circumferentially spaced planar exterior surfaces thereon for controlling rotation of the stud support and the stud with respect to the base plate.

\* \* \* \* \*

UNITED STATES PATENT AND TRADEMARK OFFICE
CERTIFICATE OF CORRECTION

PATENT NO. : 5,842,678
DATED : December 1, 1998
INVENTOR(S) : Paul A. Svejkovsky It is certified that error appears in the above-indentified patent and that said Letters Patent is hereby corrected as shown below:

In column 8, line 51, "dimpleportion" insert a space between --dimple portion--.

In column 10, line 46, after "passageway" insert --,--.

Signed and Sealed this

Twenty-third Day of March, 1999

Attest:

Q. TODD DICKINSON

Attesting Officer

Acting Commissioner of Patents and Trademarks